(12) United States Patent
Yamada et al.

(10) Patent No.: US 6,435,465 B1
(45) Date of Patent: Aug. 20, 2002

(54) SEAT ADJUSTER

(75) Inventors: Yukifumi Yamada, Toyota; Naoaki Hoshihara, Aichi-Ken; Kazunari Miyaki; Satoshi Kawaguchi, both of Takaoka, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/713,218

(22) Filed: Nov. 16, 2000

(30) Foreign Application Priority Data

Nov. 16, 1999 (JP) ............................................ 11-325376

(51) Int. Cl.⁷ .............................................. A47C 1/023
(52) U.S. Cl. ........................................ 248/429; 248/430
(58) Field of Search .................. 248/429, 430; 297/344.11

(56) References Cited

U.S. PATENT DOCUMENTS

| | | | | |
|---|---|---|---|---|
| 4,204,658 A | * | 5/1980 | Courtois ..................... | 248/430 |
| 4,580,755 A | * | 4/1986 | Rees .......................... | 248/430 |
| 4,664,442 A | | 5/1987 | Stolper et al. | |
| 5,052,751 A | * | 10/1991 | Hayakawa et al. ..... | 248/429 X |
| 5,076,529 A | * | 12/1991 | Dove et al. ................ | 248/429 |
| 5,285,993 A | * | 2/1994 | Kamata et al. ........ | 248/430 X |
| 5,676,341 A | * | 10/1997 | Tarusawa et al. ........... | 248/430 |
| 5,765,802 A | * | 6/1998 | Bostrom et al. ........ | 248/429 X |
| 5,772,173 A | * | 6/1998 | Couasnon .................... | 248/430 |
| 5,785,292 A | * | 7/1998 | Muraishi et al. ........ | 248/430 X |
| 5,797,575 A | * | 8/1998 | Clausen ....................... | 248/429 |
| 5,800,015 A | * | 9/1998 | Tsuchiya et al. ........ | 248/430 X |
| 5,897,091 A | * | 4/1999 | Hayakawa et al. ......... | 248/430 |
| 6,286,799 B1 | * | 9/2001 | Fujii .......................... | 248/430 |

FOREIGN PATENT DOCUMENTS

| | | |
|---|---|---|
| DE | 35 18 949 C2 | 7/1991 |
| JP | 7-8055 | 2/1995 |

* cited by examiner

*Primary Examiner*—Rodney B. White
(74) *Attorney, Agent, or Firm*—Burns, Doane, Swecker & Mathis, LLP

(57) ABSTRACT

A step-wise seat adjuster for automotive vehicles is made up of a stationary lower guide rail adapted to be mounted to a vehicle floor, and a movable upper guide rail adapted to be mounted to a vehicle seat and capable of lengthwise sliding movement relative to the stationary lower guide rail. Either the stationary lower guide rail or the movable upper guide rail have a lateral side portion in which are formed a plurality of regularly spaced openings. Each of the openings is surrounded by a pair of vertically spaced co-planar surfaces extending in the vertical direction and a pair of parallely spaced surfaces which are opposed with each other in the lengthwise direction. A lock mechanism is adapted to releasably engage one of the plurality of regularly spaced openings to restrict the movement of the movable upper guide rail relative to the stationary lower guide rail.

Figure 1:
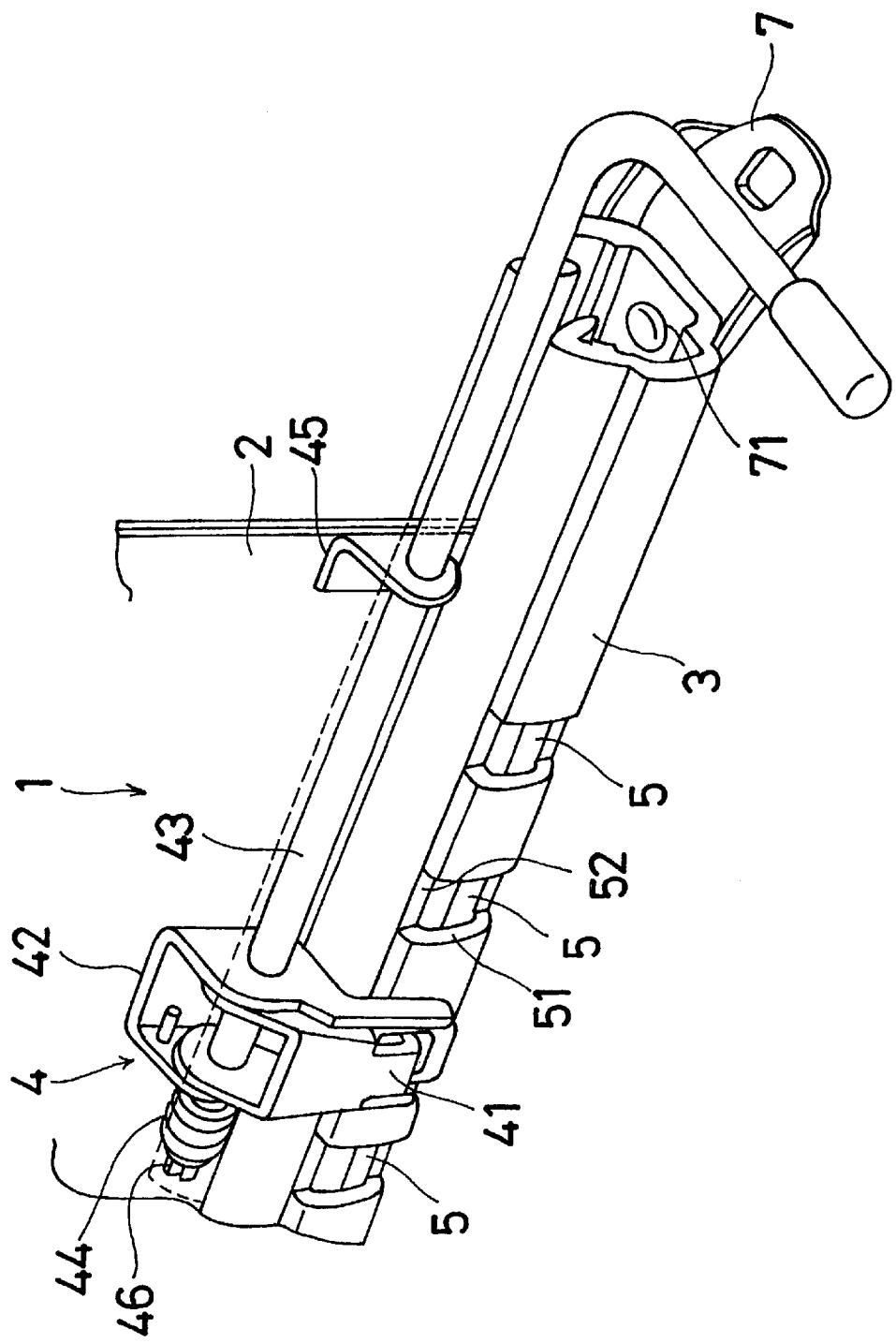

17 Claims, 3 Drawing Sheets

SEAT ADJUSTER

This application is based on and claims priority under 35 U.S.C. 517 119 with respect to Japanese Application No. 11(1999)-325376 filed on Nov. 16, 1999, the entire content of which is incorporated herein by reference.

FIELD OF THE INVENTION

The present invention generally relates to vehicle seats for automotive vehicles. More particularly, the present invention pertains to a step-wise seat adjuster for automotive vehicle seats adjusting the lengthwise directional position of the seat.

BACKGROUND OF THE INVENTION

A known type of step-wise seat adjuster is disclosed in, for example, Japanese Unexamined Utility Model Registration Publication or Kokai Koho No. Hei.7-8055 published on Feb. 3, 1995. In this known step-wise seat adjuster, each stationary lower guide and movable upper guide rail is formed of a light-weight material such as aluminum. A plurality of locking openings are formed in the stationary lower guide rail such that one of the openings is brought into engagement with a lock mechanism for restricting the movement of the movable upper guide rail relative to the stationary lower guide rail.

However, in this known step-wise seat adjuster, the stationary lower guide rail is produced through aluminum extrusion. As a result, the locking openings cannot be formed concurrently with the aluminum extrusion of the lower rail. In addition, each of the locking openings is formed in the lateral side of the lower guide rail which includes slope surfaces and is placed between a pair of vertically spaced side surfaces which are formed at the slope surfaces, receptively. Thus, the side surfaces are not coplanar with each other. This makes it virtually impossible to form the lower guide rails by stamping which is a very inexpensive operation.

Thus, a need exists for an improved step-wise adjuster for automotive vehicle seats that is not as susceptible to the drawbacks and disadvantages discussed above.

SUMMARY OF THE INVENTION

According to one aspect of the present invention, a step-wise seat adjuster for automotive vehicles includes a stationary lower guide rail adapted to be mounted to a vehicle floor, and a movable upper guide rail adapted to be mounted to a vehicle seat and capable of lengthwise sliding movement relative to the stationary lower guide rail. Either the stationary lower guide rail or the movable upper guide rail have a lateral side portion in which are formed a plurality of regularly spaced openings. Each of the openings is surrounded by a pair of vertically spaced co-planar surfaces extending in the vertical direction and a pair of parallel spaced surfaces which are opposed with each other in the lengthwise direction. A lock mechanism is adapted to releasably engage one of the plurality of regularly spaced openings to restrict the movement of the movable upper guide rail relative to the stationary lower guide rail.

The plural openings can advantageously be formed simultaneously through an inexpensive method using a punch and dies which carry out a shearing action.

According to another aspect of the invention, a step-wise seat adjuster for automotive vehicles includes a stationary lower guide rail adapted to be mounted to a vehicle floor, and a movable upper guide rail adapted to be mounted to a vehicle seat and capable of lengthwise sliding movement relative to the stationary lower guide rail. Either the stationary lower guide rail or the movable upper guide rail have a lateral side portion in which are formed a plurality of spaced apart openings. Each of the openings is defined by a plurality of surfaces including a pair of first surfaces facing in the same direction and a pair of second surfaces positioned in opposing relation to face one another. A lock mechanism is adapted to releasably engage one of the plurality of spaced openings to restrict movement of the movable upper guide rail relative to the stationary lower guide rail.

Another aspect of the present invention involves a step-wise seat adjuster for automotive vehicles includes a stationary lower guide rail adapted to be mounted to a vehicle floor, and a movable upper guide rail adapted to be mounted to a vehicle seat and capable of lengthwise sliding movement relative to the stationary lower guide rail. Either the stationary lower guide rail or the movable upper guide rail have a lateral side portion in which are formed a plurality of spaced apart openings. Each of the openings is defined by a plurality of surfaces including a pair of first surfaces positioned along opposite sides of the opening and a pair of second surfaces positioned along opposite sides of the opening, with the second sides being located laterally outwardly relative to the first surfaces. A lock mechanism is adapted to releasably engage one of the plurality of spaced openings to restrict movement of the movable upper guide rail relative to the stationary lower guide rail.

BRIEF DESCRIPTION OF THE DRAWING FIGURES

Figure 2:
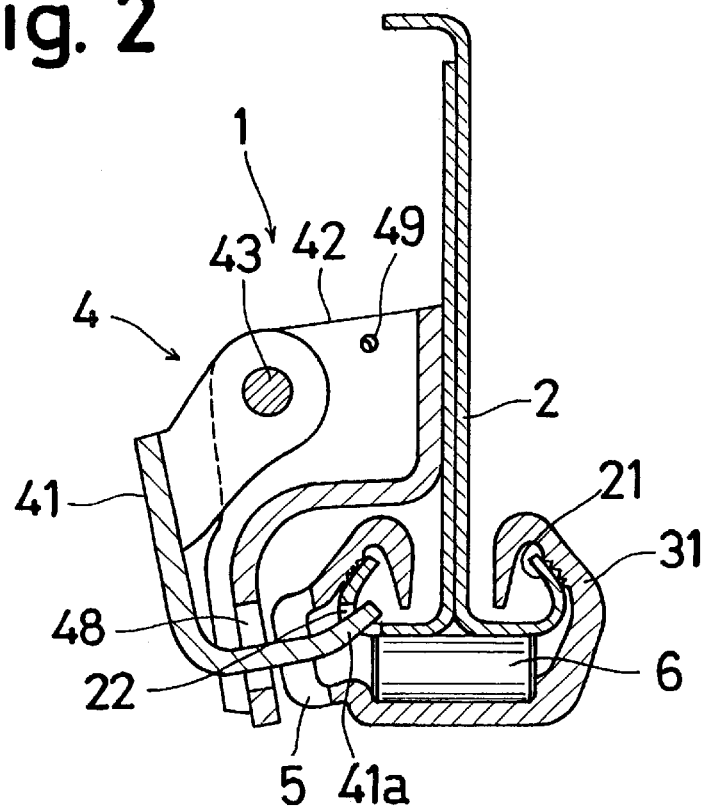
Figure 3:
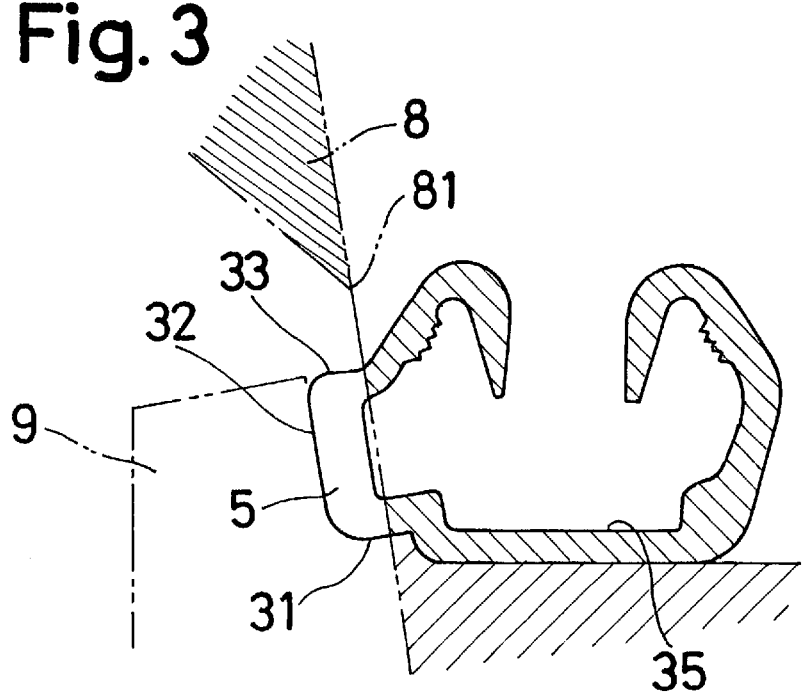
Figure 4:
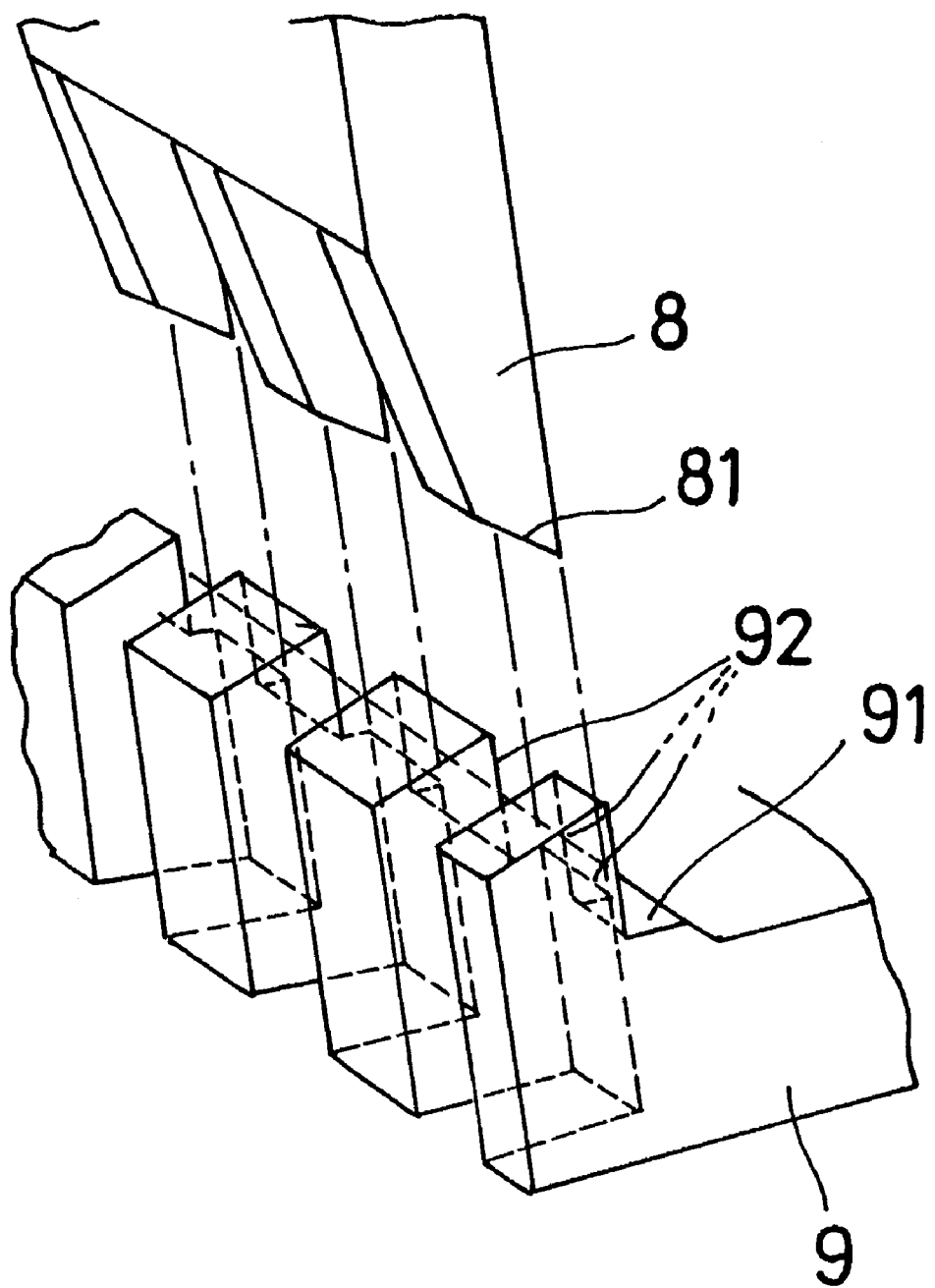

The foregoing and additional features and characteristics of the present invention will become more apparent from the following detailed description considered with reference to the accompanying drawing figures in which like reference numerals designate like elements and wherein:

FIG. 1. is a perspective view of a step-wise seat adjuster for automotive vehicles according to an embodiment of the present invention;

FIG. 2. is a cross-sectional view of a lock mechanism of the seat adjuster illustrated in FIG. 1;

FIG. 3 illustrates how a plurality of openings are formed in a simultaneous fashion;

FIG. 4. illustrates a set of punch and dies used for forming the plural openings.

DETAILED DESCRIPTION OF THE INVENTION

Referring initially to FIGS. 1 and 2, a step-wise seat adjuster for automotive vehicles includes a stationary lower guide rail 3 which is mountable by way of a bracket 7 to a vehicle floor and a movable upper guide rail 2 which is mountable to a vehicle seat and which is capable of a lengthwise sliding movement relative to the lower guide rail 3. The upper and lower guide rails are preferably fabricated of aluminum. In addition, the seat adjuster includes a lock mechanism 4 provided on the upper guide rail 2 for restricting the sliding movement of the upper guide rail 2 relative to the lower guide rail 3.

The lock mechanism 4 includes a first bracket 42 secured to the upper guide rail 2, a second bracket 45 secured to the upper guide rail 2 and spaced from the first bracket 42 in the lengthwise direction of the upper guide rail 2, an operation lever rotatably mounted on both of the brackets 42, 45, and a lock pawl 41. The lock pawl 41 passes through a lock hole 48 formed in the lower side of the first bracket 42 and passes through one of a series of regularly spaced apart openings 5 formed in the lateral or first side 32 (see FIG. 3) of the lower guide rail 3. The lock pawl 41 terminates in an engaging portion 41a which engages a lock aperture 22. The engaging portion 41a, the lock hole 48, each of the openings 5, and the lock aperture 22 are set to be same with each other in width or length along the extension of the guide rail 2. When the engaging portion 41a engages or passes through one of the lock holes 48, one of the openings 5, and the lock aperture 22 aligned with one another, sliding movement of the upper guide rail 2 relative to the lower guide rail 3 is prevented so that the position of the upper guide rail 2 relative to the lower guide rail 3 is fixed.

A torsion spring 44 continually urges or biases the lock pawl 41 in a locking direction. One end of the torsion spring 44 engages a groove 46 formed at a distal end of the operation lever 43 while the other end fittingly engages a hole 49 formed in the bracket 42.

As can be seen from FIGS. 1 and 3, the first surface portion 32 at the lateral side of the lower guide rail 3 has a predetermined thickness and forms an angle of about 90 degrees relative to a bottom or second surface portion 31 whose thickness is larger than the thickness of the first surface portion 32. As a whole, the first surface portion 32 and the second surface portion 31 constitute a lateral projection projecting outwardly from the lateral side of the lower guide rail 3 (i.e., from portions of the side of the lower guide rail located above and below the projection) and extending in the lengthwise direction of the lower guide rail 3. It is thus possible to form the plural openings 5 concurrently or at the same time by shearing the lateral projection through use of a set of punches 8 and dies 9 as shown if FIG. 4. That is, the bottom surface portion of the lateral projection rests or is supported on a support surface 91 of the dies 9. Through operation of the die apparatus, the edge teeth 92 of the dies 9 and the edge teeth 81 of the punch 8 shear the side surface portion 32 of the lower guide rail 3 in a partial mode to define or form the plural openings 5. This operation produces the openings 5 each having a pair of horizontally spaced apart surfaces 51, 51 positioned on opposite sides of the hole in opposing relation to each other so that the surfaces 51, 51 face one another, and a pair generally vertically spaced apart coplanar surfaces 52, 52 positioned on opposites sides of the opening. The surfaces 51, 51, 52, 52 forming each opening surround and define the periphery of the opening 5.

Each of the surfaces 51, 51 that are spaced apart in the lengthwise direction extend not only in the vertical direction, but also extend outwardly in the lateral direction. The surfaces 51, 51 are also exposed or face inwardly towards each other, and are located laterally outwardly of the other pair of surfaces 52, 52. In addition, each of the surfaces 51, 51 forms an angle of about 90 degrees relative to the vertically spaced co-planar surfaces 52, 52.

The co-planar surfaces 52, 52 extend in the vertical direction (i.e., the surfaces 52, 52 extend in the vertical direction with respect to the thickness dimension) and are exposed or face outwardly in the lateral direction. The surfaces 51, 51 are brought into engagement with the engaging portion 41a of the lock pawl 41.

The upper guide rail 2 has a lower end portion which is positioned in an inner space of the lower guide rail 3. The lower end portion of the upper guide rail 2 is symmetrical about a vertical plane and terminates in a pair of laterally spaced engaging portions or ends 21, 21. The engaging ends 21, 21 of the upper guide rail 2 are brought into sliding engagement with a pair of opposed inner surfaces, respectively, of the lower guide rail 3 and serve to prevent the upper guide rail 3 from being separated or disengaged from the lower guide rail 3. In addition, a roller 6 is disposed between the upper surface of the bottom portion 35 of the lower guide rail 3 and each of the engaging portions 21, 21 for establishing smooth sliding movement of the upper guide rail 2 relative to the lower guide rail 3.

It is possible that the step-wise seat adjuster of the present invention can be modified in various ways. For example, the lock mechanism 4 and the plural openings 5 can be provided at the sides of the lower guide rail 3 and the upper guide rail 2, respectively.

In accordance with the present invention, the step-wise seat adjuster can be produce at lowered cost than known types of step-wise seat adjusters through a shearing operation which uses the combination of a punch and dies.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A step-wise seat adjuster for automotive vehicles comprising:
   a stationary lower guide rail mountable to a vehicle floor;
   a movable upper guide rail mountable to a vehicle seat and adapted to slide in a lengthwise direction relative to the stationary lower guide rail, one if the stationary lower guide rail and the movable upper guide rail having a lateral side portion in which are formed a plurality of spaced openings, each of the openings being surrounded by a pair of vertically spaced coplanar surfaces extending in the vertical direction and a pair of parallel and spaced apart surfaces which oppose each other in the lengthwise direction; and
   a lock mechanism for releasably engaging one of the plurality of spaced openings to restrict movement of the movable upper guide rail relative to the stationary lower guide rail.

2. The step-wise seat adjuster for automotive vehicles as set forth in claim 1, wherein the lateral side portion is in the form of a projection and includes a first surface portion in which the openings are formed and a second surface portion making an angle relative to the first surface portion.

3. The step-wise seat adjuster for automotive vehicles as set forth in claim 2, wherein the projection possess a cross-section that is adapted to be sheared to form the openings.

4. The step-wise seat adjuster for automotive vehicles as set forth in claim 1, wherein the openings are formed simultaneously.

5. The step-wise seat adjuster for automotive vehicles as set forth in claim 1, wherein the stationary lower guide rail and the movable upper guide rail are formed of aluminum.

6. A step-wise seat adjuster for automotive vehicles comprising:

a stationary lower guide rail mountable on a vehicle floor;

a movable upper guide rail mountable to a vehicle seat and slidably movable in a lengthwise direction relative to the stationary lower guide rail, one of the stationary lower guide rail and the movable upper guide rail having a lateral side portion in which are formed a plurality of spaced apart openings, each of the openings being defined by a plurality of surfaces including a pair of first surfaces facing in the same direction and a pair of second surfaces positioned in opposing relation to face one another; and a lock mechanism for releasably engaging one of the plurality of spaced openings to restrict movement of the movable upper guide rail relative to the stationary lower guide rail.

7. The step-wise seat adjuster for automotive vehicles as set forth in claim 6, wherein the pair of second surfaces are located laterally outwardly of the pair of first surfaces.

8. The step-wise seat adjuster for automotive vehicles as set forth in claim 6, wherein the first surfaces are coplanar and face laterally outwardly.

9. The step-wise seat adjuster for automotive vehicles as set forth in claim 6, wherein the lateral side portion is in the form of a projection and includes a first surface portion in which the openings are formed and a second surface portion making an angle relative to the first surface portion.

10. The step-wise seat adjuster for automotive vehicles as set forth in claim 6, wherein the stationary lower guide rail and the movable upper guide rail are formed of aluminum.

11. A step-wise seat adjuster for automotive vehicles comprising:

a stationary lower guide rail mountable on a vehicle floor;

a movable upper guide rail mountable to a vehicle seat and slidably movable in a lengthwise direction relative to the stationary lower guide rail, one of the stationary lower guide rail and the movable upper guide rail having a lateral side portion in which are formed a plurality of spaced openings, each of the openings being defined by a plurality of surfaces including a pair of first surfaces facing in the same direction and positioned along a first pair of opposite sides of the opening and a pair of second surfaces positioned along a second pair of opposite sides of the opening, the second surfaces being located laterally outwardly relative to the first surfaces; and a lock mechanism for releasably engaging one of the plurality of spaced openings to restrict movement of the movable upper guide rail relative to the stationary lower guide rail.

12. The step-wise seat adjuster for automotive vehicles as set forth in claim 11, wherein the first surfaces are perpendicular to the second surfaces.

13. The step-wise seat adjuster for automotive vehicles as set forth in claim 11, wherein the second surfaces face one another.

14. The step-wise seat adjuster for automotive vehicles as set forth in claim 11, wherein the first surfaces are coplanar and face laterally outwardly.

15. The step-wise seat adjuster for automotive vehicles as set forth in claim 11, wherein the lateral side portion is in the form of a projection and includes a first surface portion in which the openings are formed and a second surface portion forming an angle relative to the first surface portion.

16. The step-wise seat adjuster for automotive vehicles as set forth in claim 11, wherein the stationary lower guide rail and the movable upper guide rail are formed of aluminum.

17. The step-wise seat adjuster for automotive vehicles as set forth in claim 1, wherein the pair of parallel and spaced apart surfaces which oppose each other in the lengthwise direction are located laterally outwardly of the pair of vertically spaced outwardly facing coplanar surfaces.

* * * * *